United States Patent
Li et al.

(10) Patent No.: US 9,052,206 B2
(45) Date of Patent: Jun. 9, 2015

(54) GENERATING AN INDOOR MAP MODEL

(75) Inventors: Guanfeng Li, Fremont, CA (US); Faen Zhang, Beijing (CN); Feng Wang, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/118,689

(22) PCT Filed: Jan. 12, 2012

(86) PCT No.: PCT/CN2012/070287
§ 371 (c)(1),
(2), (4) Date: Nov. 19, 2013

(87) PCT Pub. No.: WO2013/104127
PCT Pub. Date: Jul. 18, 2013

(65) Prior Publication Data
US 2014/0078150 A1 Mar. 20, 2014

(51) Int. Cl.
| | | |
|---|---|---|
| *G06T 11/20* | (2006.01) | |
| *G01C 21/20* | (2006.01) | |
| *G06T 11/60* | (2006.01) | |
| *G06T 17/05* | (2011.01) | |
| *G06K 9/00* | (2006.01) | |
| *G06T 7/40* | (2006.01) | |

(52) U.S. Cl.
CPC .............. *G01C 21/206* (2013.01); *G06T 11/60* (2013.01); *G06T 17/05* (2013.01); *G06K 9/00637* (2013.01); *G06T 7/408* (2013.01); *G06T 11/206* (2013.01)

(58) Field of Classification Search
None
See application file for complete search history.

(56) References Cited

U.S. PATENT DOCUMENTS

| | | |
|---|---|---|
| 8,659,598 B1 | 2/2014 | Norberg |
| 2002/0060679 A1 | 5/2002 | Malzbender et al. |
| 2002/0061755 A1 | 5/2002 | Nohara et al. |
| 2004/0225437 A1 | 11/2004 | Endo et al. |
| 2004/0263514 A1 * | 12/2004 | Jin et al. ........................ 345/440 |
| 2008/0180637 A1 | 7/2008 | Kjeldsen et al. |

(Continued)

FOREIGN PATENT DOCUMENTS

| | | |
|---|---|---|
| CN | 1356670 A | 7/2002 |
| CN | 1573811 A | 2/2005 |
| CN | 101556158 A | 10/2009 |
| CN | 101593209 A | 12/2009 |

(Continued)

OTHER PUBLICATIONS

International Search Report and Written Opinion dated Oct. 25, 2012 for PCT/CN2012/070287.

(Continued)

*Primary Examiner* — David Zarka
*Assistant Examiner* — Khoa Vu
(74) *Attorney, Agent, or Firm* — Lerner, David, Littenberg, Krumholz & Mentlik, LLP

(57) ABSTRACT

A method and system for providing an indoor map representation are provided herein. Aspects of this disclosure provide a representation of an indoor map environment whereby navigable areas are represented by a series of convex polygons in adjacency relationships with one another. Image analysis may be performed on a floor plan image to identify navigable areas and to determine the boundaries of the polygons, such as by assigning one or more colors to navigable space and one or more colors to non-navigable space. Route-finding operations may be performed using the adjacency relationships to find a path from a source area to a destination area.

18 Claims, 5 Drawing Sheets

(56) References Cited

U.S. PATENT DOCUMENTS

| | | |
|---|---|---|
| 2009/0076719 A1 | 3/2009 | Geise et al. |
| 2010/0020093 A1* | 1/2010 | Stroila et al. .................. 345/589 |
| 2010/0121567 A1 | 5/2010 | Mendelson |
| 2010/0299065 A1* | 11/2010 | Mays ........................... 701/209 |
| 2010/0309227 A1 | 12/2010 | Yokosuka |
| 2011/0216935 A1* | 9/2011 | Mays et al. .................. 382/100 |
| 2012/0274642 A1* | 11/2012 | Ofek et al. .................... 345/441 |
| 2012/0316782 A1 | 12/2012 | Sartipi et al. |
| 2013/0080120 A1 | 3/2013 | Venkatesh et al. |

FOREIGN PATENT DOCUMENTS

| | | |
|---|---|---|
| CN | 101895953 A | 11/2010 |
| CN | 101946265 A | 1/2011 |
| CN | 102157001 A | 8/2011 |
| WO | 2011041745 A1 | 4/2011 |

OTHER PUBLICATIONS

International Search Report and Written Opinion dated Oct. 25, 2012 for PCT/CN2012/070288.

* cited by examiner

GENERATING AN INDOOR MAP MODEL

CROSS REFERENCE TO RELATED APPLICATIONS

The present application is a national phase entry under 35 U.S.C. §371 of International Application No. PCT/CN2012/070287, filed Jan. 12, 2012, published in English. The entire disclosure of the above-identified application is incorporated by reference herein.

BACKGROUND

The proliferation of smart phones and other mobile devices has placed more processing power in the hands of consumers than ever before. These mobile devices are capable of executing a variety of applications, including applications that assist with navigation and route-finding. Traditional global positioning system (GPS) navigation devices are used to assist automobile owners with driving operations from a source to a destination, and navigation software is generally developed with the use-case of driving directions in mind. These devices may provide map data in the form of a road graph, with valid driving paths represented by line segments which intersect at various points, and which have a directionality element indicating valid directions of travel along the line segments. Such a design is efficient for use in situations where the user is travelling via a vehicle, as the vehicle is limited to particular pathways of travel.

However, as mobile devices increasingly contain route finding software, various solutions that provide for walking and indoor navigation have also been developed. In particular, walking and indoor navigation environments do not typically conform to easy representation via a series of interconnected line segments. These environments may include non-uniformly shaped open spaces that intersect across line segments, instead of at points. Generation of map representations of these environments using traditional road graph models may not accurately capture the relationship between possible destinations and navigable paths.

BRIEF SUMMARY

A method and system for generating an indoor map model are provided herein. Aspects of this disclosure provide a representation of an indoor map environment whereby navigable areas are represented by a series of convex polygons in adjacency relationships with one another. Image analysis may be performed on a floor plan image to identify navigable areas and to determine the boundaries of the polygons, such as by assigning one or more colors to navigable space and one or more colors to non-navigable space. Route-finding operations may be performed using the adjacency relationships to find a path from a source area to a destination area.

Aspects of the disclosure describe a computer-implemented method for generating a map model. The method may include identifying one or more first colors in an image as associated with navigable space in a geographic area, analyzing, using a processor, the image to identify areas of the navigable space by identifying pixels within the image that correspond to the one or more first colors, generating one or more convex polygons that cover the areas of the navigable space, and generating the map model. The map model may include the one or more convex polygons and a set of adjacency relationships among the one or more convex polygons. The method may further include identifying one or more second colors in the image as associated with non-navigable space in the floor plan. The method may also include identifying one or more elements of the image other than the one or more first colors that correspond to features of the floor plan, and associating the one or more elements with one or more of the polygons as polygon metadata. At least one of the one or more elements may be a text string. The method may further include generating at least one of the one or more convex polygons by identifying an initial navigable pixel and analyzing adjacent pixels expanding outward from the initial navigable pixel. The method may also include identifying one or more boundaries of the convex polygons by extrapolating one or more non-navigable areas identified by the analysis of adjacent pixels into navigable areas to ensure that the boundaries of the polygons are convex. The method may include providing the map model to a client device for use in navigation operations. The map model may include a series of vertices that define the one or more convex polygons. The series of vertices may be associated with location coordinates within a given geographical area within the floor plan.

Aspects of the disclosure may provide a non-transitory computer readable medium comprising instructions that, when executed by a processor, cause the processor to perform a method. The method executed by the processor may include identifying one or more first colors in an image as associated with navigable space in a floor plan, analyzing the image to identify areas of the navigable space by identifying pixels within the image that correspond to the one or more first colors, generating one or more convex polygons that cover the areas of the navigable space, and generating the map model. The map model may include the one or more convex polygons and a set of adjacency relationships among the one or more convex polygons. The method may further include identifying one or more second colors in the image as associated with non-navigable space in the floor plan. The method may further include identifying one or more elements of the image other than the one or more first colors that correspond to features of the floor plan, and associating the one or more elements with one or more of the polygons as polygon metadata. At least one of the one or more elements may be a text string. The method may further include generating at least one of the one or more convex polygons by identifying an initial navigable pixel and analyzing adjacent pixels expanding outward from the initial navigable pixel. The method may further include identifying one or more boundaries of the convex polygons by extrapolating one or more non-navigable areas identified by the analysis of adjacent pixels into navigable areas to ensure that the boundaries of the polygons are convex. The map model may be provided to a client device for use in navigation operations. The map model may include a series of vertices that define the one or more convex polygons, wherein the series of vertices are associated with location coordinates within a given geographical area within the floor plan.

Aspects of the disclosure may provide a processing system for providing indoor navigation. The processing system may include at least one processor and a memory coupled to the at least one processor. The memory may store an image corresponding to a geographic area. The processor may be configured to identify one or more first colors in the image as associated with navigable space in the geographic area, analyze the image to identify areas of the navigable space by identifying pixels within the image that correspond to the one or more first colors, generate one or more convex polygons that cover the areas of the navigable space, and generate the map model. The map model may include the one or more convex polygons and a set of adjacency relationships among the one or more convex polygons. The processor may be further configured to identify one or more second colors in the image as associated with non-navigable space in the geographic area. The processor may be further configured to identify one or more elements of the image other than the one or more first colors that correspond to features of the geographic area, and to associate the one or more elements with one or more of the polygons as polygon metadata. At least one of the one or more elements may be a text string. The processor may be configured to generate at least one of the one or more convex polygons by identifying an initial navigable pixel and analyzing adjacent pixels expanding outward from the initial navigable pixel. The processor may be further configured to identify one or more boundaries of the convex polygons by extrapolating one or more non-navigable areas identified by the analysis of adjacent pixels into navigable areas to ensure that the boundaries of the polygons are convex. The processor may be further configured to provide the map model to a client device for use in navigation operations. The map model may include a series of vertices that define the one or more convex polygons, wherein the series of vertices are associated with location coordinates within a given geographical area within the floor plan.

DETAILED DESCRIPTION

A method and system for generating an indoor map model are described here. Aspects of this disclosure provide for generation of a map model that can be used to perform navigation and route-finding operations. An image of a floor plan may be translated into an indoor map representation by assigning one or more colors to navigable space, and one or more colors to non-navigable space. Areas of navigable space may be analyzed to identify one or more polygons that fill the areas of navigable space. Adjacency relationships between polygons may be identified among the identified polygons. The indoor map representation may be provided to a client device as a series of vertices that describe the polygons and relationship data that identifies the adjacency relationships among the polygons.

Figure 1:
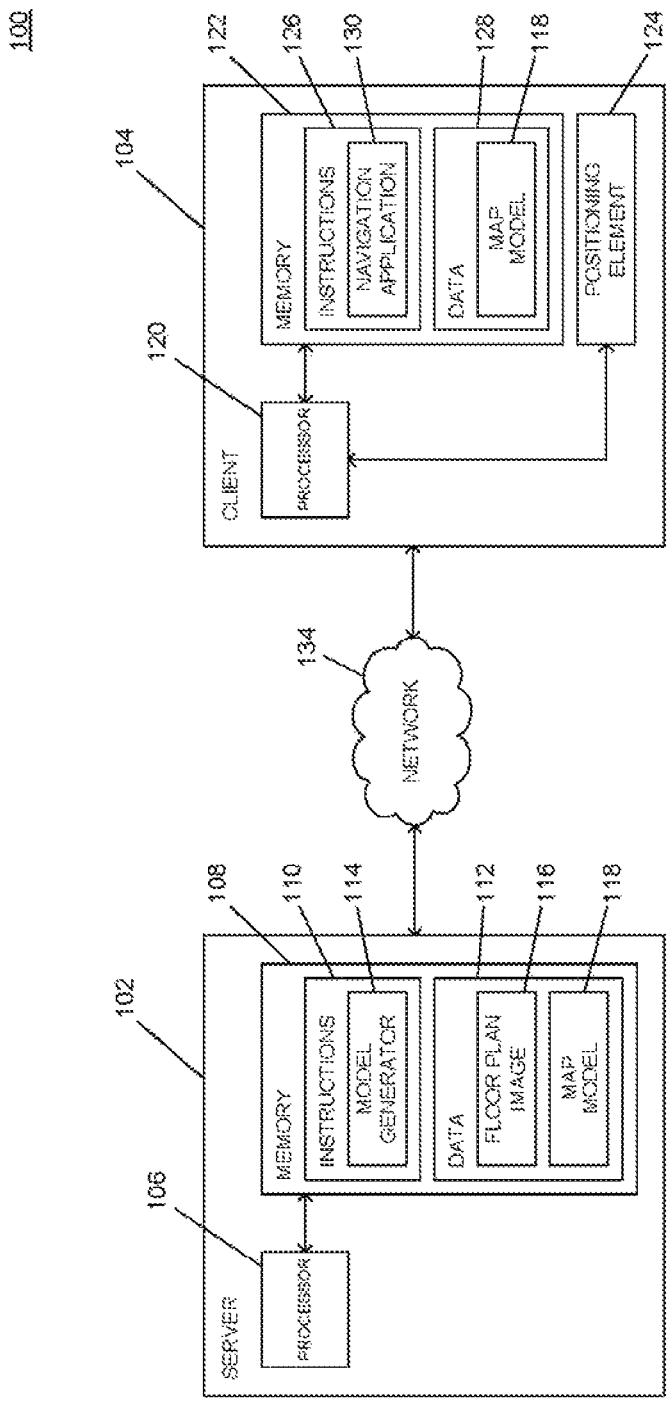
FIG. 1 is a system diagram depicting an example of an indoor navigation system in accordance with aspects of the disclosure.

FIG. 1 is a system diagram depicting an example of an indoor navigation system 100 in accordance with aspects of the disclosure. As shown in FIG. 1, an example indoor navigation system 100 includes a server 102 and a client 104 in communication via a network 134. The server 102 may provide a map model 118 to the client 134 for use in navigation operations. The server 102 may generate the map model 118 using a floor plan image 116.

The server 102 may include a processor 106, a memory 108 and other components typically present in general purpose computers. The memory 108 may store instructions 110 and data 112 that are accessible by the processor 106. The processor 106 may execute the instructions 110 and access the data 112 to control the operations of the server 102.

The processor 106 may be any suitable processor, such as various commercially available general purpose processors. Alternatively, the processor 106 may be a dedicated controller such as an application-specific integrated circuit ("ASIC") or a field-programmable gate array ("FPGA").

The memory 108 may be any type of tangible memory operative to store information accessible by the processor 106, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

Although FIG. 1 functionally illustrates the processor 106 and memory 108 as each being within a single block respectively, it should be understood that the processor 106 and memory 108 may actually comprise multiple processors and memories that may or may not be stored within the same physical housing. Accordingly, references to a processor, computer or memory will be understood to include references to a collection of processors, computers or memories that may or may not operate in parallel.

The instructions 112 may be any set of instructions to be executed directly (such as machine code) or indirectly (such as scripts) by the processor 108. For example, the instructions 112 may be stored as computer code on a non-transitory computer-readable medium. In that regard, the terms "instructions" and "programs" may be used interchangeably herein. The instructions 112 may be stored in object code format for direct processing by the processor 108, or in any other computer language including scripts or collections of independent source code modules that are interpreted on demand or compiled in advance. Functions, methods and routines of the instructions are explained in more detail below (see FIGS. 3-5).

In order to facilitate the map model generation operations of the server 102, the instructions 112 may comprise a model generator 114. The model generator 114 may create a map model 118 using a floor plan image 116. The floor plan image 116 may be any image relating to a building floor plan or an indoor or outdoor map. The map generator 114 may analyze the floor plan image 116 stored within the data 112 to identify navigable and non-navigable areas, and to generate one or more polygons to fill the navigable areas. These polygons may be used to create the map model 118, which may also be stored within the data 112. The map model 118 may be provided to the client 104 for use in navigation operations. The floor plan image 116 may be provided in any image format, such as bitmap, JPEG, GIF, TIFF, PDF, DXF, AUG, or any other image format that can be analyzed by a computer to identify navigable and non-navigable areas.

The data 112 may be retrieved, stored or modified by the processor 106 in accordance with the instructions 110. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data. Although a number of discrete modules and data sets (e.g., 114, 116, 118) are identified in connection with the server 102, the functionality of these modules and data may overlap and/or exist in a fewer or greater number of modules than what is shown, with such modules residing at one or more processing devices, which may be geographically dispersed.

The server 102 may be at one node of a network and be operative to directly and indirectly communicates with other nodes of the network. For example, the server 102 may comprise a web server that is operative to communicate with the client 104 via the network such that the server 102 transmits the map model 118 to the client 104 for use in navigation operations, or provides navigation routing information using the map model 118 using information provided by the client 104.

The client 104 may comprise a personal computer, a personal digital assistants ("PDA"), a tablet PC, a netbook, a rack mounted server, a laptop, a mobile phone, a smart phone etc. Indeed, the client 104 in accordance with the systems and methods described herein may comprise any device operative to process instructions and transmit data to and from humans and/or other computers including general purpose computers, network computers lacking local storage capability, etc.

The client 104 may be similarly configured to the server 102 as described above. For example, the client 104 may comprise a processor 120 coupled to a memory 122. As described above with respect to the memory 108, the memory 122 may include instructions 126 and data 128. The instructions 126 may include a navigation application 130.

The navigation application 130 operates to provide a user of the client 104 with navigation services, such as providing directions from the user's current location to a destination, or determination of the user's current location. The navigation application 130 may interface with a positioning element 124 to receive the current location of the client 104. For example the positioning element 124 may be a GPS receiver that receives location information from one or more positioning satellites. Alternately or in addition, the positioning element 124 may determine the user's location by measuring reception from one or more cellular towers, or may identify the user's location by identifying nearby wireless networks. For situations in which the systems discussed here collect information about users, the users may be provided with an opportunity to opt in/out of programs or features that may collect personal information (e.g., information about a user's location, a user's preferences or a user's contributions to social content providers). In addition, in some examples, certain data may be anonymized in one or more ways before it is stored or used, so that personally identifiable information is removed. For example, a user's identity and location may be anonymized so that the personally identifiable information cannot be determined or associated for the user and so that identified user preferences or user interactions are generalized (for example, generalized based on user demographics) rather than associated with a particular user. Aspects that rely on a user location may identify the location in a general manner. For example, the system may provide information in a binary manner (e.g., a user is nearby, or they are not nearby) rather than specifically identifying a proximity or location.

The navigation application 130 may use a map model 132 stored in the data 128 to perform navigation operations. As described with respect to the server 102, the client 104 may store a copy of the map model 118 that may include a series of polygons and adjacency relationships between those polygons, where the polygons correspond to navigable areas of a floor plan. An example of a method for performing routing functions using such a map model is described below (see FIG. 5).

The network 134, and the intervening nodes between the server 102 and the client 104 may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Figure 2:
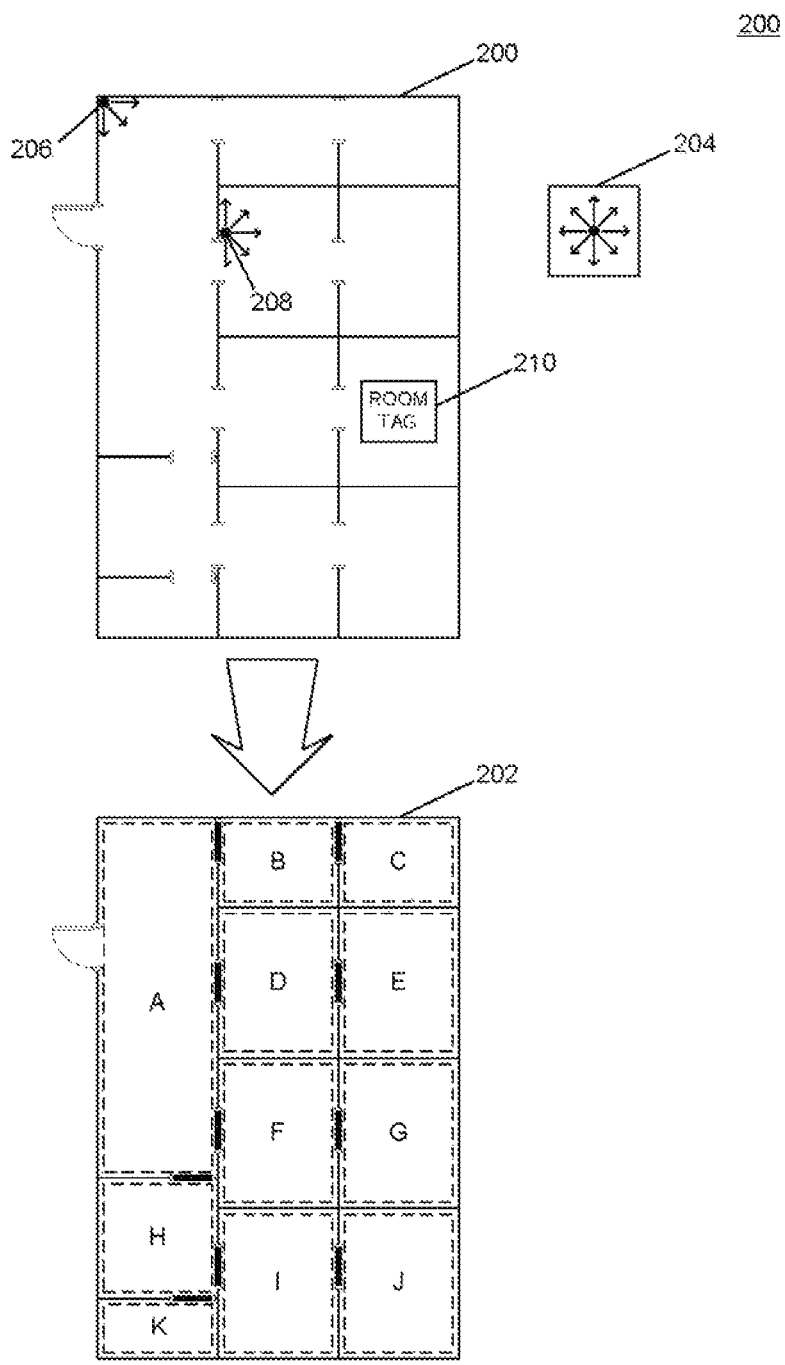
FIG. 2 is block diagram depicting an example of a map model generated from a floor plan in accordance with aspects of the disclosure.

FIG. 2 is block diagram depicting an example of a map model 202 generated from a floor plan 200 in accordance with aspects of the disclosure. One example of a method for generating a map model for use in navigation operations involves analysis of an image associated with a building floor plan. Analysis of this image allows for identification of navigable areas and non-navigable areas. The navigable areas may be filled with convex polygons, and adjacency relationships between the polygons may be used to assist with navigation operations.

As described above with respect to FIG. 1, the floor plan may be provided in any format readable by a computer, including various file formats, such as GIF, JPEG, PDF, TIFF, BMP, DXF, etc. Areas of navigable space within the floor plan may be associated with one or more colors present within the image, and areas of non-navigable space may be associated with another set of one or more colors. The color assignments may be performed manually by a user, or automatically using an image analysis algorithm. The term "color" is broadly understood to refer to elements that define an image pixel. The features analyzed by aspects of the disclosure may also include brightness, luminosity, grayscale, or any other feature that may distinguish whether a particular pixel is associated with navigable space or non-navigable space.

An analysis operation may begin by identifying a first pixel in an upper left corner of the image, such as the pixel 206. The color of this pixel 206 may be analyzed to determine whether the pixel corresponds to navigable space or non-navigable space. If the currently analyzed pixel corresponds to navigable space, the analysis operation may expand outward from the pixel in 8 directions, such as shown in element 204 of FIG. 2. In this instance, the pixel 206 has navigable areas to the right, lower-right, and below, so the analysis would next proceed to those pixels. The pixel 208 represents the start of a new polygon that might be reached from continued analysis of pixels adjacent to the initial pixel 206. The pixel 208 has open space to above, above-right, right, below-right, and below, to start forming a new polygon. In this manner, each pixel of the floor plan may be analyzed to identify areas of navigable space.

Areas of non-navigable space (e.g., walls) may be identified by their association with the second set of one or more colors. These non-navigable areas may be extrapolated to identify one or more convex polygons that fill the navigable space. For example, the floor plan 200 may be divided into a set of polygons A-K as depicted in the example map model 202. The polygons that fill the navigable space may further be analyzed to identify adjacency relationships, depicted as the shaded lines between adjacent polygons. The map model 202 may be converted into a data structure where each polygon is identified by a series of vertices (e.g., corners of the polygon) and a list of adjacent polygons. These vertices may correspond to map coordinates, latitudes and longitudes, or any other method of identifying the relationship between the area encompassed by the polygon in the map model and the navigable space in the mapped area defined by the floor plan.

In some aspects, the image analysis may also identify one or more image tags, such as the room tag 210. These tags may be associated with text strings and identified by optical character recognition (OCR) techniques. These image tags may be used to associate polygons with particular elements of the image. For example, a room may be labeled as "Conference Room A." When that room is analyzed to generate the map model, this text may be recognized and stored in the map model as metadata associated with the polygon corresponding to the room for the purpose of route-finding operations. The user may then be routed to that room when requesting navigation instructions to "Conference Room A."

Figure 3:
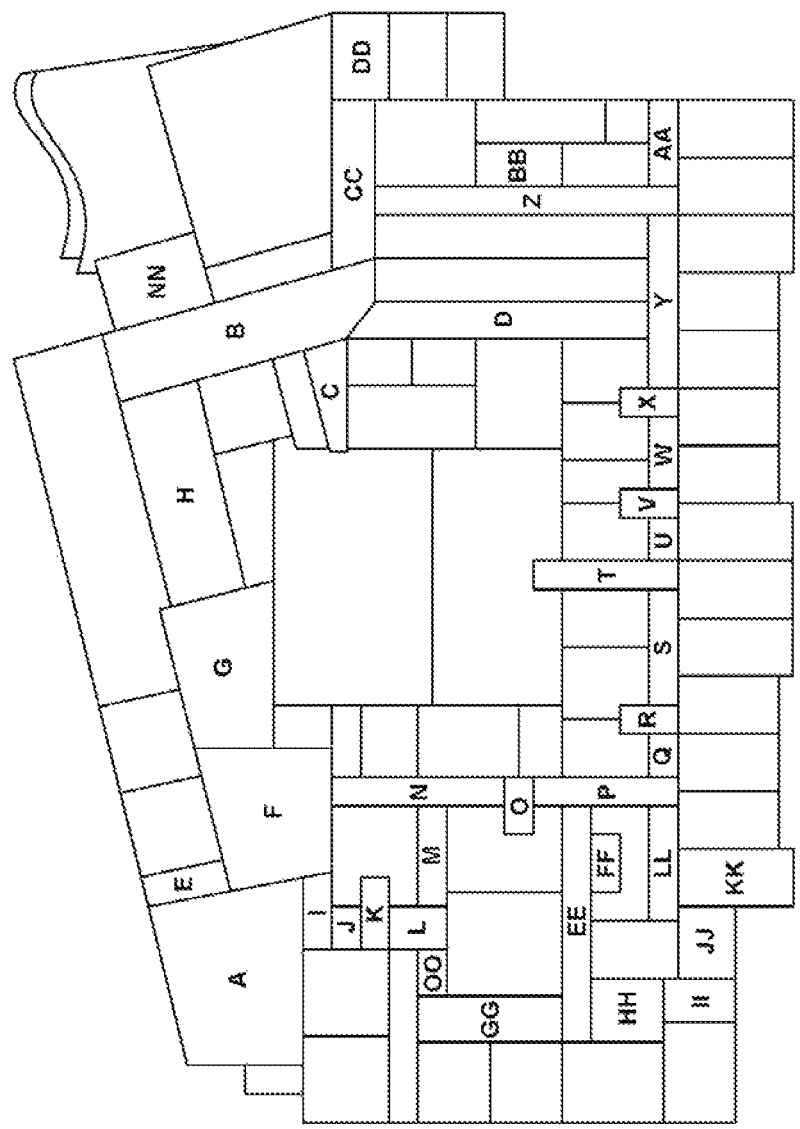
FIG. 3 is a diagram depicting an example of a map model overlaid on a floor plan image in accordance with aspects of the disclosure.

FIG. 3 is a diagram depicting an example of a map model overlaid on a floor plan image in accordance with aspects of the disclosure. As shown in the image, navigable areas of an office building floor plan (e.g., hallways, doorways, rooms, and the like) have been divided into a series of polygons A-OO. In the instant example, these polygons are associated with pixels having a gray color. Convex polygons, such as the polygons depicted in the image, may be used to ensure that any given pair of polygons has at most one common side/adjacency relationship. If a user is within polygon A and wishes to travel to an area associated with polygon B, a navigation application may analyze adjacency relationships present within the image map to route the user via polygons F, G, and H to arrive at polygon B. An example of a method for performing routing operations using such a map model is described further below (see FIG. 5).

Figure 4:
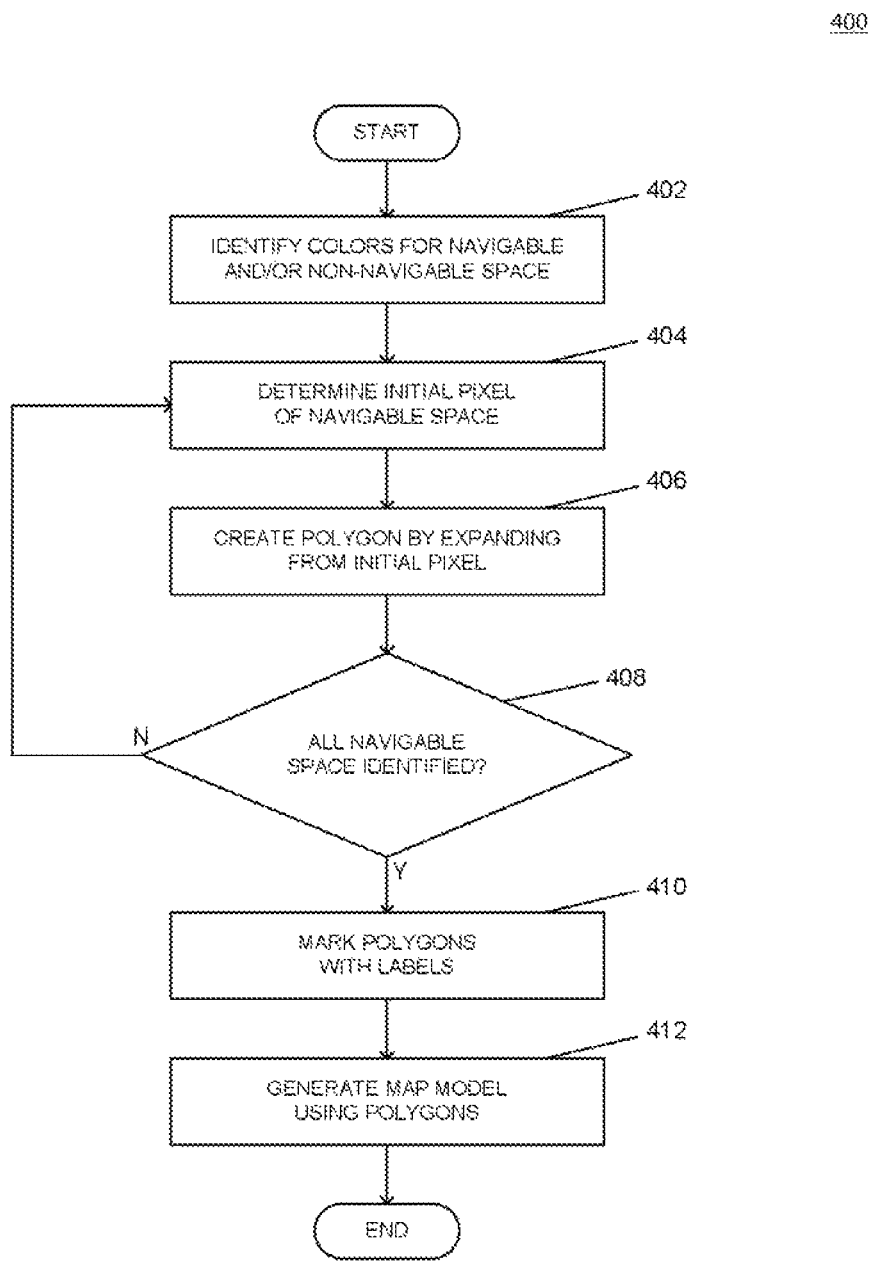
FIG. 4 is a flow diagram depicting an example of a method for generating a map model from a floor plan image in accordance with aspects of the disclosure.

FIG. 4 is a flow diagram depicting an example of a method 400 for generating a map model from a floor plan image in accordance with aspects of the disclosure. The method 400 is operable to analyze an image corresponding to a floor plan, and generate a map model suitable for performing navigation operations from the analysis. A computer, such as the server 102 described with respect to FIG. 1, may analyze pixels of the floor plan image to determine whether each pixel corresponds to navigable space or non-navigable space. Areas of navigable space may be filled with convex polygons, and adjacency relationships between these convex polygons may be used to perform routing and navigation operations.

At stage 402, colors are identified for navigable areas and non-navigable areas. Navigable areas are generally areas in which travel and navigation is possible, such as hallways, doorways, open space, sidewalks, roads, and the like. Non-navigable areas are areas through which travel is obstructed, such as walls, shrubbery, landscaping, and the like. Certain colors may be assigned to navigable areas, and other colors assigned to non-navigable areas. Certain colors may be designated as navigable and all others designated as non-navigable, or any other method of assigning colors to differentiate between navigable areas and non-navigable areas. For example, navigable areas may be associated with the color gray, and non-navigable areas with the color black, navigable areas may be associated with the color white, and non-navigable areas associated with any non-white color, or navigable areas maybe associated with the colors blue and green, and non-navigable areas associated with the colors red and black. In some aspects, colors may be automatically assigned to navigable and non-navigable areas based on analysis of the image.

At stage 404, an initial pixel of navigable space is identified for analysis. At the start of the analysis, a pixel in the upper left corner of the image may be identified as the initial pixel. Each pixel in sequence may be analyzed starting in the upper left corner until a pixel of navigable space is identified. A pixel may be identified as navigable space if the pixel is associated with a color identified as associated with a navigable area at stage 402. If the analysis is already underway, then an initial pixel may be identified in relation to a previously defined polygon within the image. For example, the pixel of navigable space closest to the upper left corner of the image that is not already within a defined polygon may begin another round of analysis. As the analysis expands from pixels of navigable space, areas of non-navigable space are identified by their association with the colors of non-navigable space determined at stage 402. These areas of non-navigable space may be used to determine the borders of one or more polygons that identify navigable space.

Each pixel of the floor plan image may be associated with a particular set of latitude and longitude coordinates, or any other set of data suitable for associating the floor plan to a corresponding navigable area. This association data may be included in image metadata, or it may be provided separately during the map model generation process, such as by selecting a particular building that the floor plan describes. A relative set of coordinates may also be used. For example, a point on the map may be designated as the origin, and every other point on the map may be identified relative to the origin. Indoor navigation techniques that correspond to this relative coordinate system may be employed (e.g., calibration based on indoor landmarks associated with relative coordinates).

At stage 406, a polygon may be created by expanding from the initial pixel. For example, the polygon may be defined by analyzing pixels in 8 directions from the initial pixel to determine areas of navigable space around the initial pixel, such as described above with respect to FIG. 2. The method may explicitly define convex polygons within the image to ensure that each set of two polygons has no more than a single line segment in common. Polygon boundaries may be determined by identifying locations of non-navigable space, and extrapolating the boundaries of the polygon from the non-navigable space to ensure the polygons remain convex. In one example, polygon boundaries are identified by expanding from an initial pixel in a clockwise manner. When exploring the map, polygon boundaries may be identified by moving clockwise from the current pixel. By constraining analysis in this manner and tracking the area of the polygon that has already been defined, the open space will always be divided into convex polygons. A polygon is thus defined that encompasses as much navigable space as possible while remaining convex and not overlapping with any non-navigable space.

At stage 408, a determination is made as to whether all navigable space within the floor plan image is associated with a polygon. For example, the pixel analysis of stages 404 and 406 may identify areas of navigable space that cannot be associated with a convex polygon. These areas of navigable space may thus be separately analyzed for creation of a new polygon to ensure that all navigable space is associated with a polygon that may later be used for route finding operations. Alternately, each pixel of the floor plan that has not been associated with a polygon may be analyzed to ensure that each area of navigable space is associated with a polygon, even if that polygon is not adjacent with any previously mapped polygons. If unassociated navigable space remains, the method returns to stage 404 to continue the analysis. If all navigable space has been identified and associated with a polygon, the method proceeds to stage 410.

At stage 410, the polygons associated with the areas of navigable space are associated with any identifiers present within the floor plan. For example, the floor plan may label hallways, corridors, or rooms with text labels to designate the name of the particular hall, corridor, or room. In this manner, a polygon that is associated with a particular room may be given a name for that room, such as "Conference Room A." If the floor plan does not include labels, the polygons may be assigned particular labels by the processing system. Each polygon may be associated with a unique label, or other data describing the area encompassed by the polygon. The method may also identify other features and data describing the polygon and its relationship to the original floor plan, which may also be associated and stored with the polygon in a map model of the area associated with the floor plan.

At stage 412, a map model is generated using the polygons created at stage 406. The map model includes vertices that define each polygon and adjacency relationships between the polygons. Each vertex may be associated with a set of latitude and longitude coordinates, or any other method of associating a particular polygon to a particular area of space for the purpose of navigation and route finding operations. The data structure associated with the map model may include a series of vertices defining each polygon and a list of adjacency relationships between the polygons. The method 400 ends after generation of the map model.

Figure 5:
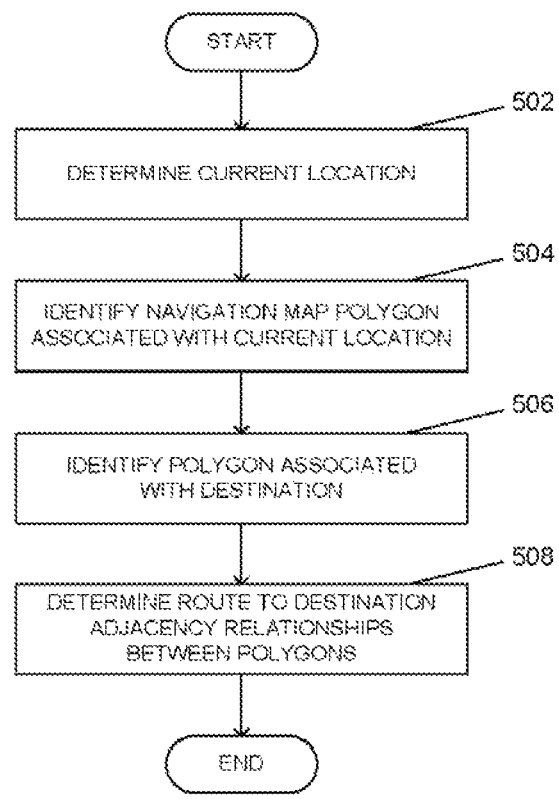
FIG. 5 is a flow diagram depicting an example of a method for navigating using an indoor map model in accordance with aspects of the disclosure.

FIG. 5 is a flow diagram depicting an example of a method 500 for navigating using an indoor map model in accordance with aspects of the disclosure. A map model as described above (see FIGS. 1-4) may be used to perform navigation operations on a client. The map model may comprise a series of convex polygons defined by vertices, and adjacency relationships between those polygons. A client may determine an initial location using a navigation element, and use the initial location to identify a source polygon. The client may determine a route to a destination by creating a path through a series of polygons that are adjacent to one another, where the final polygon in the path is associated with the destination. Performing route finding operations in this manner ensures that a path exists for all source locations to all destination locations, providing the entire navigable area is associated with polygons in some form of adjacency relationship.

At stage 502, the current location of the client is determined. The current location may be determined by a navigation element of the client device (see FIG. 1). As described above, the navigation element may determine the current location of the client in a variety of manners, including but not limited to using GPS satellites, identification of cellular towers, identification of wireless networks, or any other method suitable for identifying an initial position of the client. For example, the navigation element may comprise a GPS receiver that provides a set of latitude and longitude coordinates for the client device.

At stage 504, a source polygon is identified using the current location obtained at stage 502. By defining each polygon as the area bounded by line segments connecting a series of vertices, where the vertices are each associated with a coordinate, it is relatively simple computationally to determine whether the current location falls within a particular polygon. For example, if a polygon is defined by four vertices at ordinal coordinates (0,0), (2,0), (2,2), and (0, 2), the point (1,1) would be contained within the space defined by the four vertices. Implementations of the method may rely on the use of convex polygons, ensuring that each set of vertices completely encloses a given set of navigable space, further simplifying the process of determining whether a given point is within the polygon.

At stage 506, a polygon associated with a destination is determined. The user may enter a destination on the client by inputting a text string or selecting a destination from a menu. The user may also be presented with the map model overlaid on a floor plan, such as to enable touch screen selection of the destination. As with the user's current location, the destination is associated with a particular polygon. The destination may be located within a polygon, or adjacent to a polygon, depending upon whether the destination is defined as a navigable area (and thus within a polygon), or a non-navigable area (and thus not within a polygon). The destination may be identified using a particular map tag extracted from the floor plan image during generation of the map model (see FIG. 2).

After determining a polygon associated with the destination, at stage 508 a route from the source polygon to the destination polygon is identified using adjacency relationships between the polygons. Various methods may be used to identify a path across adjacency relationships between the source polygon and the destination polygon, including common searching algorithms such as, for example Djikstra's shortest path algorithm or a Breadth First Search. The path to the destination across the adjacent polygons may be provided to the user to assist with navigation operations, such as by providing directions to the next polygon in the route using adjacency information, or by highlighting the series of polygons on a map overlay.

The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide an efficient map model for use in navigation operations. The map model may include a simplified representation of a navigable area compared to traditional road graph implementations, such that navigable areas are represented by a series of vertices defining convex polygons, and a set of adjacency relationships among the polygons. The map model may be particularly well suited for indoor navigation operations, which are typically performed by mobile devices that may lack processing power compared to vehicle mounted navigation systems. Furthermore, the map model described may be particularly useful for indoor navigation operations since the polygon representation described ensures that, as long as the navigable area is contiguous, any two points within the navigable area have a path between the two points, unlike road graph implementations which sometimes include approximations based on nearest paths. Such an implementation solves the so-called "pedestrian problem" where a nearest road line segment is not necessarily the optimal path to travel to a given point that exists external to the road graph, thus failing to provide an optimal path to a pedestrian traveler, who is not bound by to particular roads.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer implemented method for generating a map model, the method comprising:
   identifying one or more first colors in an image as associated with navigable space in a geographic area;
   analyzing, using a processor, the image to identify areas of the navigable space by identifying pixels within the image that correspond to the one or more first colors;
   generating at least one or more convex polygons that cover the areas of the navigable space by identifying an initial navigable pixel and analyzing adjacent pixels expanding outward from the initial navigable pixel;
   identifying one or more boundaries of the at least one or more convex polygons by extrapolating one or more non-navigable areas identified by the analysis of adjacent pixels into navigable areas to ensure that the boundaries of the one or more polygons are convex; and
   generating the map model, wherein the map model comprises the one or more convex polygons and a set of adjacency relationships among the one or more convex polygons.

2. The method of claim 1, further comprising identifying one or more second colors in the image as associated with non-navigable space in the geographic area.

3. The method of claim 1, further comprising identifying one or more elements of the image other than the one or more first colors that correspond to features of the geographic area, and associating the one or more elements with one or more of the polygons as polygon metadata.

4. The method of claim 3, wherein at least one of the one or more elements is a text string.

5. The method of claim 1, further comprising providing the map model to a client device for use in navigation operations.

6. The method of claim 1, wherein the map model comprises a series of vertices that define the one or more convex polygons, wherein the series of vertices are associated with location coordinates within the geographic area.

7. A non-transitory computer readable medium comprising instructions that, when executed by a processor, cause the processor to perform a method comprising:
   identifying one or more first colors in an image as associated with navigable space in a floor plan;
   analyzing the image to identify areas of the navigable space by identifying pixels within the image that correspond to the one or more first colors;
   generating at least one or more convex polygons that cover the areas of the navigable space by identifying an initial navigable pixel and analyzing adjacent pixels expanding outward from the initial navigable pixel;
   identifying one or more boundaries of the at least one or more convex polygons by extrapolating one or more non-navigable areas identified by the analysis of adjacent pixels into navigable areas to ensure that the boundaries of the one or more polygons are convex; and
   generating the map model, wherein the map model comprises the one or more convex polygons and a set of adjacency relationships among the one or more convex polygons.

8. The non-transitory computer readable medium of claim 7, further comprising identifying one or more second colors in the image as associated with non-navigable space in the floor plan.

9. The non-transitory computer readable medium of claim 7, further comprising identifying one or more elements of the image other than the one or more first colors that correspond to features of the floor plan, and associating the one or more elements with one or more of the polygons as polygon metadata.

10. The non-transitory computer readable medium of claim 9, wherein at least one of the one or more elements is a text string.

11. The non-transitory computer readable medium of claim 7, further comprising providing the map model to a client device for use in navigation operations.

12. The non-transitory computer readable medium of claim 7, wherein the map model comprises a series of vertices that define the one or more convex polygons, wherein the series of vertices are associated with location coordinates within a given geographical area within the floor plan.

13. A processing system for providing indoor navigation comprising:
   at least one processor; and
   a memory coupled to the at least one processor, the memory comprising an image corresponding to a geographic area;
   wherein the at least one processor is configured to:
   identify one or more first colors in the image as associated with navigable space in the geographic area;
   analyze the image to identify areas of the navigable space by identifying pixels within the image that correspond to the one or more first colors;
   generate at least one or more convex polygons that cover the areas of the navigable space by identifying an initial navigable pixel and analyzing adjacent pixels expanding outward from the initial navigable pixel;
   identifying one or more boundaries of the at least one or more convex polygons by extrapolating one or more non-navigable areas identified by the analysis of the adjacent pixels into navigable areas to ensure that the boundaries of the one or more polygons are convex; and
   generate the map model, wherein the map model comprises the one or more convex polygons and a set of adjacency relationships among the one or more convex polygons.

14. The processing system of claim 13, wherein the processor is further configured to identify one or more second colors in the image as associated with non-navigable space in the geographic area.

15. The processing system of claim 13, wherein the processor is further configured to identify one or more elements of the image other than the one or more first colors that correspond to features of the geographic area, and to associate the one or more elements with one or more of the polygons as polygon metadata.

16. The processing system of claim 15, wherein at least one of the one or more elements is a text string.

17. The processing system of claim 13, wherein the processor is further configured to provide the map model to a client device for use in navigation operations.

18. The processing system of claim 13, wherein the map model comprises a series of vertices that define the one or more convex polygons, wherein the series of vertices are associated with location coordinates within a given geographical area within the floor plan.

* * * * *